United States Patent [19]
Leonard

[11] 3,842,708
[45] Oct. 22, 1974

[54] KEYBOARD FINGERING GUIDE

[76] Inventor: Verna M. Leonard, 8701 Hwy. 41, Fresno, Calif. 93721

[22] Filed: Feb. 22, 1974

[21] Appl. No.: 444,892

[52] U.S. Cl. .............................................. 84/485
[51] Int. Cl. ........................................... G10b 15/00
[58] Field of Search ............................. 84/470–485

[56] References Cited
UNITED STATES PATENTS

| 336,595 | 2/1886 | Rosecrans | 84/473 |
| 1,293,923 | 2/1919 | Reeve | 84/479 |
| 2,663,211 | 12/1953 | Wallace | 84/485 |
| 3,208,327 | 9/1965 | Allen | 84/471 |
| 3,733,956 | 5/1973 | Leonard | 84/471 |

Primary Examiner—Lawrence R. Franklin
Attorney, Agent, or Firm—Ralph S. Branscomb

[57] ABSTRACT

A device to teach five-tone scale patterns and five-finger fingering patterns while relating these patterns to the names of the scale tones. A pair of panels define a pocket and a disc or dial has its lower portion received and hidden in the pocket, the disc having peripherally disposed arrays of scale tones in different key signatures and these arrays can be made to register with fixed indicia denoting a five-finger sequence, the same sequence being displayed on the front panel along with selectively displayed strips reiterating the key signature and related scale tone names capable of being physically positioned in juxaposition with the corresponding keys on a keyboard.

3 Claims, 4 Drawing Figures

3,842,708

KEYBOARD FINGERING GUIDE

BACKGROUND OF THE INVENTION

The prior art in this field is quite extensive, reflecting the difficulty in learning musical notation, particularly the difficulty in relating the keys of a keyboard to the scale tone names and fingering. This prior art, however, is almost uniformly committed to application of teaching schemes and theory dictated by at least a full scale of seven or eight tones or notes, such as the major diatonic scales in the different key signatures and this involves such fingering sequences as the common 1-2-3-1-2-3-4-5 sequence for the right hand with the lowermost numeral associated in some manner with the thumb, and the thumb then "swung under" to reach the fourth tone in the scale. The validity of this teaching of fingering is not disputed for students who have progressed beyond the elementary stage, but it can be simplified for a five-tone scale teaching system in beginners' instruction. In prior art teaching of fingering the left hand or bass fingering sequence has traditionally been 5-4-3-2-1-3-2-1 and the present invention does not depart from this as far as the first five tones are concerned in the left hand fingering sequence, and there is therefore no re-learning at all for the left hand and only minor re-learning for the right hand with retention of the very significant simplification of teaching procedure for the beginning student.

There is a need, therefore, for a device to assist in a simplified teaching method relating the names and fingering sequence of the scale tones for both left and right hands.

SUMMARY OF THE INVENTION

As claimed, the instant invention fills the immediately above mentioned need for a teaching device, this visual-mechanical device comprising an envelope like base having a taller back panel with fingering sequence indicia thereon and a front panel with further indicia and a plurality of selectively exposable strips having key signature and scale tone names thereon in spaced relation to correspond with the interval of the first five tones of a diatonical scale, this structure being complemented by a disc held between the panels and adjustable so that scale tone names thereon can be juxtaposed with the numerical fingering sequence displayed on the rear panel, the relationship with the human hand being visually demonstrated by an element depicting a human hand, left or right in accordance with the fingering sequence being used, and having fingers oriented toward the corresponding numerical indicia on the rear panel and the scale tone names in an exposed position of the disc.

DESCRIPTION OF A PREFERRED EMBODIMENT OF THE INVENTION

Figures 1, 2, 3:
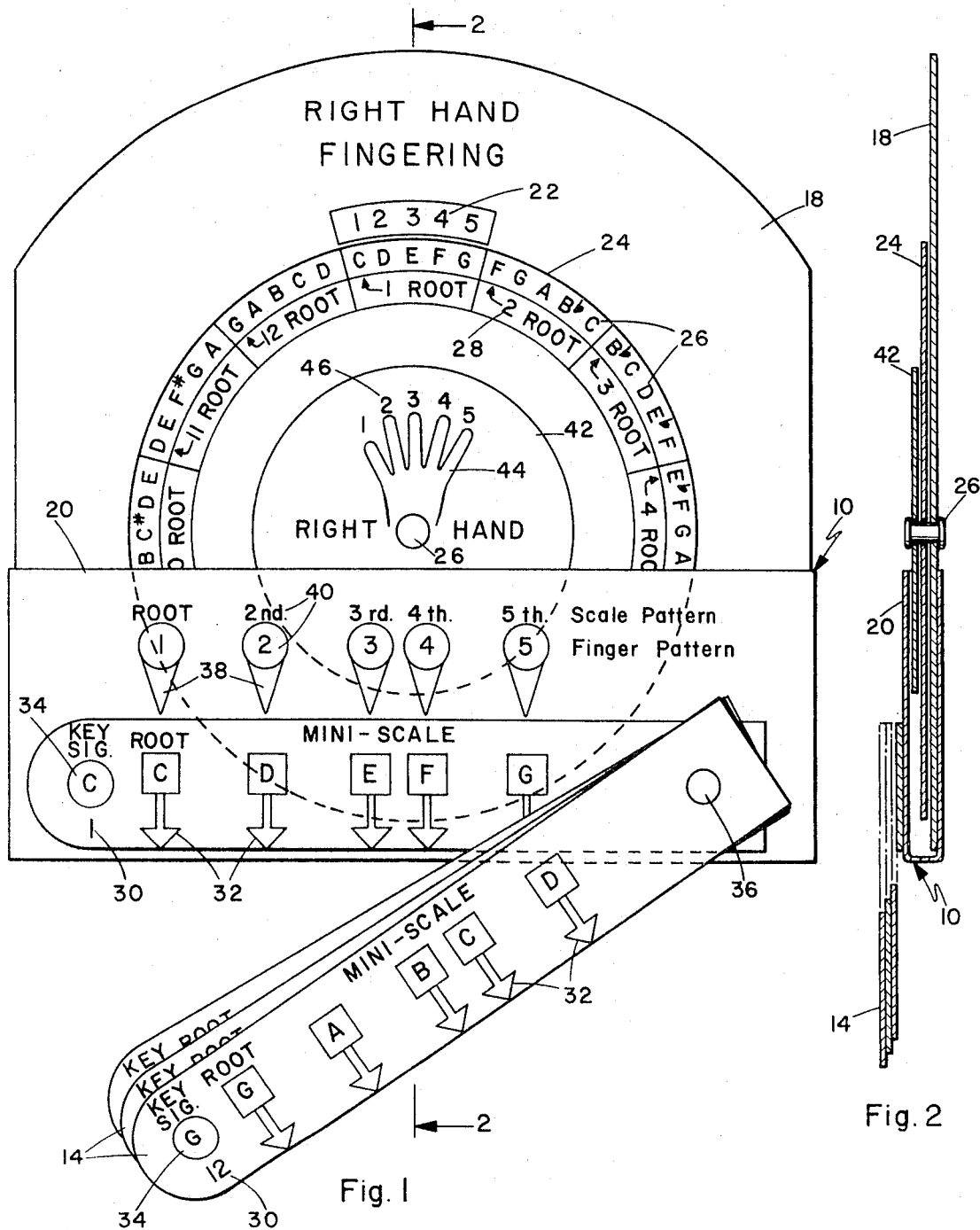
FIG. 1 is a front elevational view of the assembled guide for the right hand, the dial and strip being adjusted for demonstrating fingering relationship existing in the first five major diatonic scale tones in the key signature of C.
FIG. 2 is a vertical sectional view taken on the line 2—2 in FIG. 1.
FIG. 3 is a top edge view of the guide.
Figure 4:
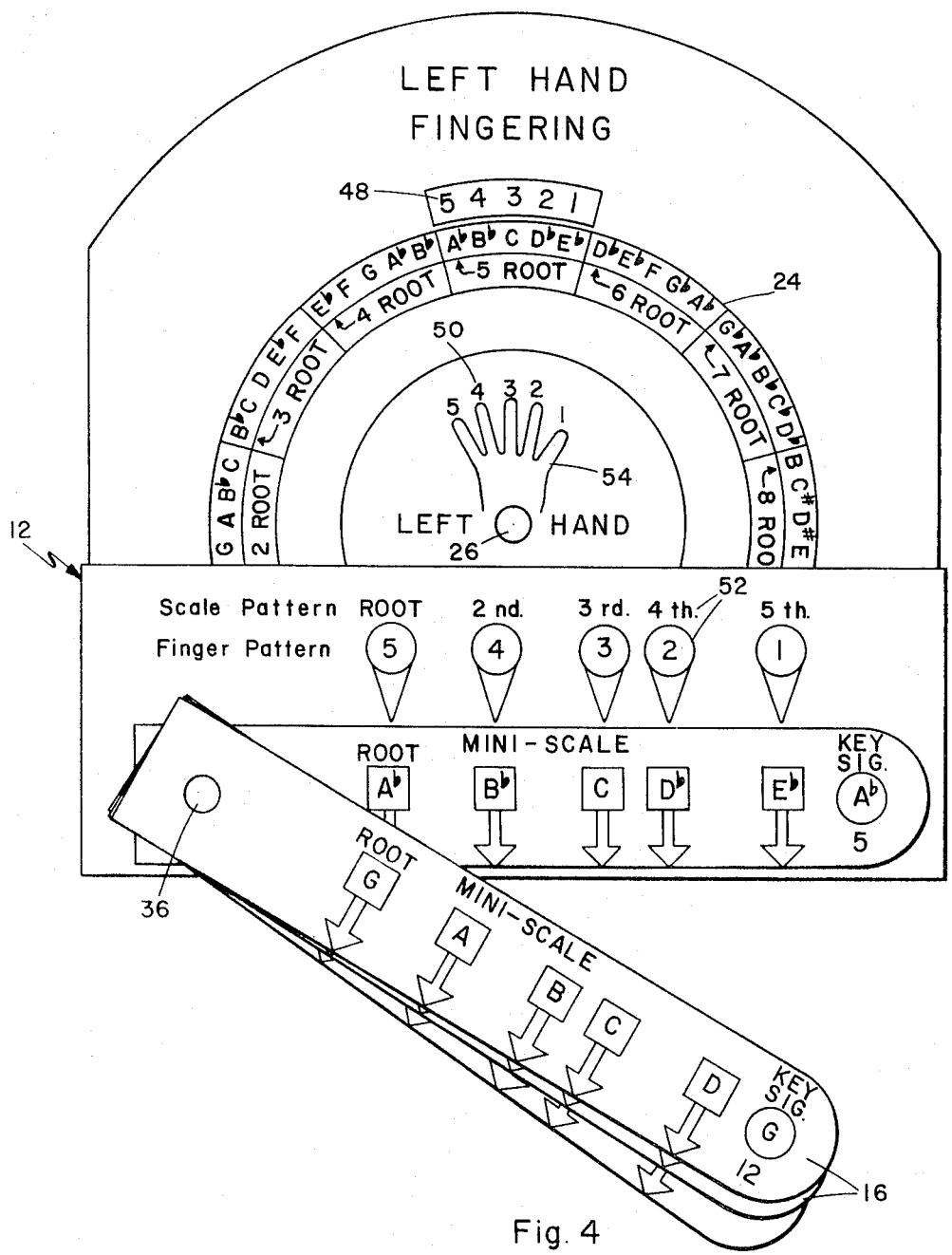
FIG. 4 is a view similar to FIG. 1, showing the guide for the left hand.

As illustrated in the drawings, this music teaching guide is constructed largely from sheet material, paper or plastic, and the principal part or base, generally indicated by the numeral 10 in FIG. 1 and by the numeral 12 in FIG. 4, the latter being slightly variant from the first in regard to the arrangement thereon of indicia and strips which are also generally indicated by the numerals 14 and 16 in FIGS. 1 and 4, respectively.

Referring first to FIGS. 1, 2 and 3, the base 10 is of envelope character with a taller rear vertical panel 18 and a front vertical panel 20 connected at their common lateral and bottom edges so that the upper portion of the rear panel 18 simulates an upright flap of the envelope-like base 10, and the numerical fingering sequence indicia 22 are printed on or otherwise applied thereto as illustrated. A disc 24, comprising at least a large segment of a circle, is rotatively adjustably mounted on the rear panel by a pivot member 26 which may be of rivet character, and this disc has peripherally applied thereto a plurality of arrays of indicia naming scale tones in a similar number of key signatures. As illustrated these arrays are arranged in successive segments which may be arbitrarily numerically numbered as indicated at 28, this numerical identification of the segment and key signature being repeated at 30 on the strips 14 to heighten the teaching function of the device in that the key signatures, scale tone names and even the intervals therebetween are thus related especially when the device is placed on the keyboard of a piano or organ with the proper strip 14 exposed and located with the scale tone indicators 32 on the strips 14 aligned with the corresponding keys on the keyboard.

It will be noted that the spacing of the scale tone indicators 32 must accurately reflect the keyboard spacing or interval arrangement, ordinarily that of a major diatonic scale, or in the illustrated form the first five scale tones thereof. The key signature may be spelled out clearly as indicated at 34 and the indicators 32 may be in the form of downwardly pointing arrows with the names of the scale tones in boxes above the arrows. The strips 14 are shown as generally rectangular and pivoted together as at 36 on the front panel 20 so that any one of the strips can be exposed.

To teach the scale degree names or scale pattern numbered points 38 are applied to the front panel 20 to correspond with and align with the indicators 32 and the pointers are numbered as at 40 to relate the scale tones with the above mentioned fingering sequence indicia 22.

The lower portion of the disc is at all times hidden by the front panel 20, and the strips 14 are ordinarily largely hidden by each other so that although a manss of information is contained in the device the exposed portion of this information is limited to avoid confusion in the student's mind.

Finally, to further heighten the association with the fingering sequence, a smaller disc 42 is mounted on the same pivot member 26 as the larger disc 24 and a human hand element 44, with fingering sequence and finger identifying numerals 46, is printed or otherwise applied to this smaller disc.

Referring now to FIG. 4, the left hand counterpart is illustrated as virtually identical to that already described except that the numerals of the fingering sequence is reversed as at 48, 50 and 52, the hand 54 of course being changed and the strips 16 are pivoted at the left side of the front panel 16. In this manner the left hand fingering guide is made to complement the teaching function of the right hand guide.

I claim:

1. A keyboard fingering guide, comprising:

a base having an upright rear panel and an upright front panel;

said panels defining therebetween a pocket with an open top;

a disc mounted on said base for rotative adjustment with a lower portion of the disc within said pocket and behind said front panel;

said disc having in peripherally arranged segments, a plurality of arrays of indicia naming scale tones in a like number of key signatures;

said rear panel having a portion extending radially outwardly from said disc and having numerals of a fingering sequence individually juxtaposable with the scale tone naming indicia in a selected single key signature on said disc;

said front panel having an array of interval indicators spaced therealong substantially according to diatonic scale intervals and the spacing of the keys on a piano keyboard; and a plurality of scale tone naming strips mounted on said base and capable of being exposed one at a time alone with said indicators on the front of said front panel, each strip having thereon the names of the scale tones in one of said key signatures.

2. A keyboard fingering guide according to claim 1 wherein said scale tone naming strips are pivotally mounted on said front panel.

3. A keyboard fingering guide according to claim 1 and including a human hand simulating element mounted on the base in front of said disc and adjacent said indicia, the human hand having numbered fingers to correspond with said numerals on the rear panel.

* * * * *